Figure 1:
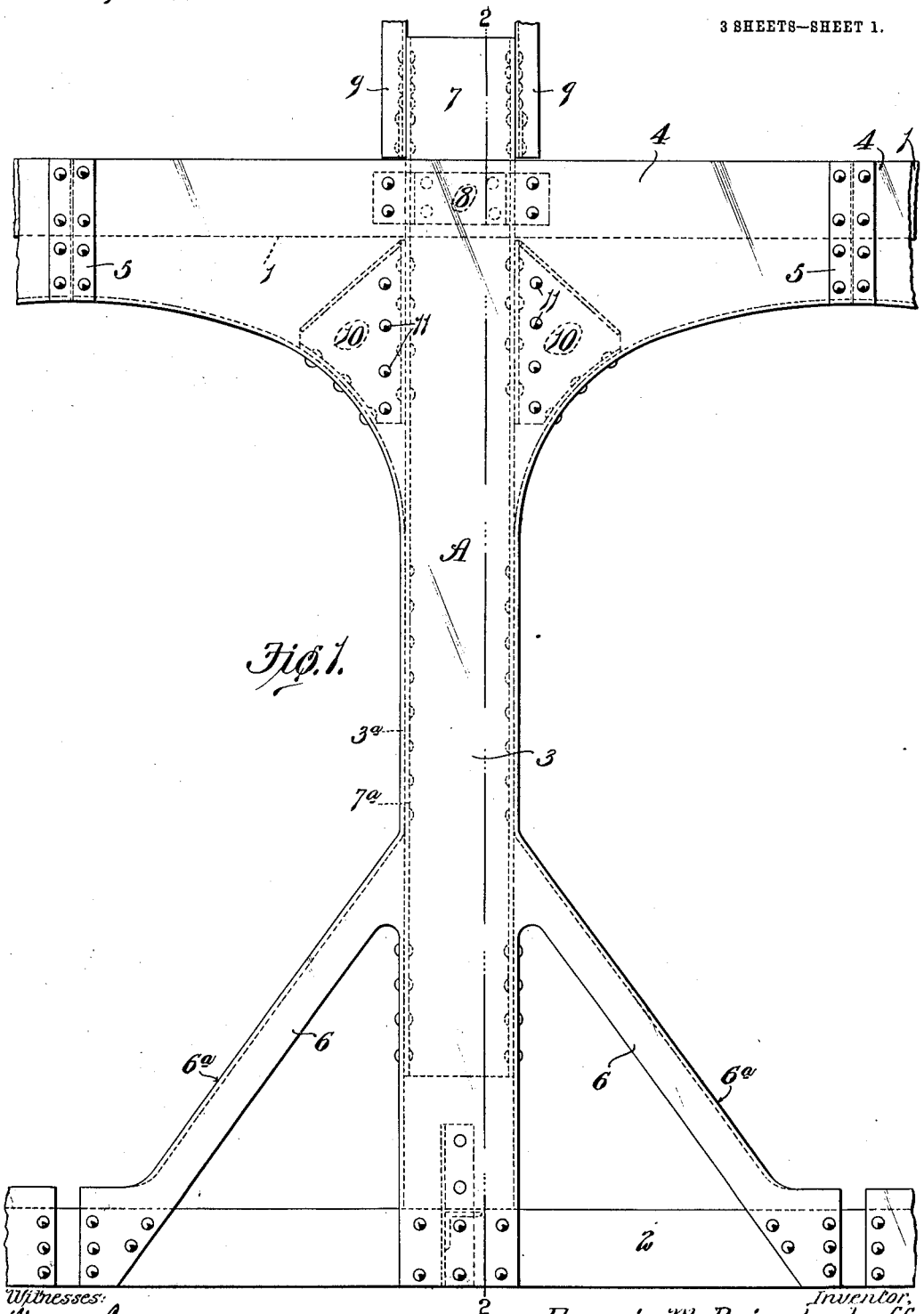

F. M. BRINCKERHOFF.
PASSENGER CAR CONSTRUCTION.
APPLICATION FILED MAY 25, 1908.

909,844.

Patented Jan. 12, 1909.

3 SHEETS—SHEET 1.

Witnesses:
Inventor,
Francis M. Brinckerhoff.

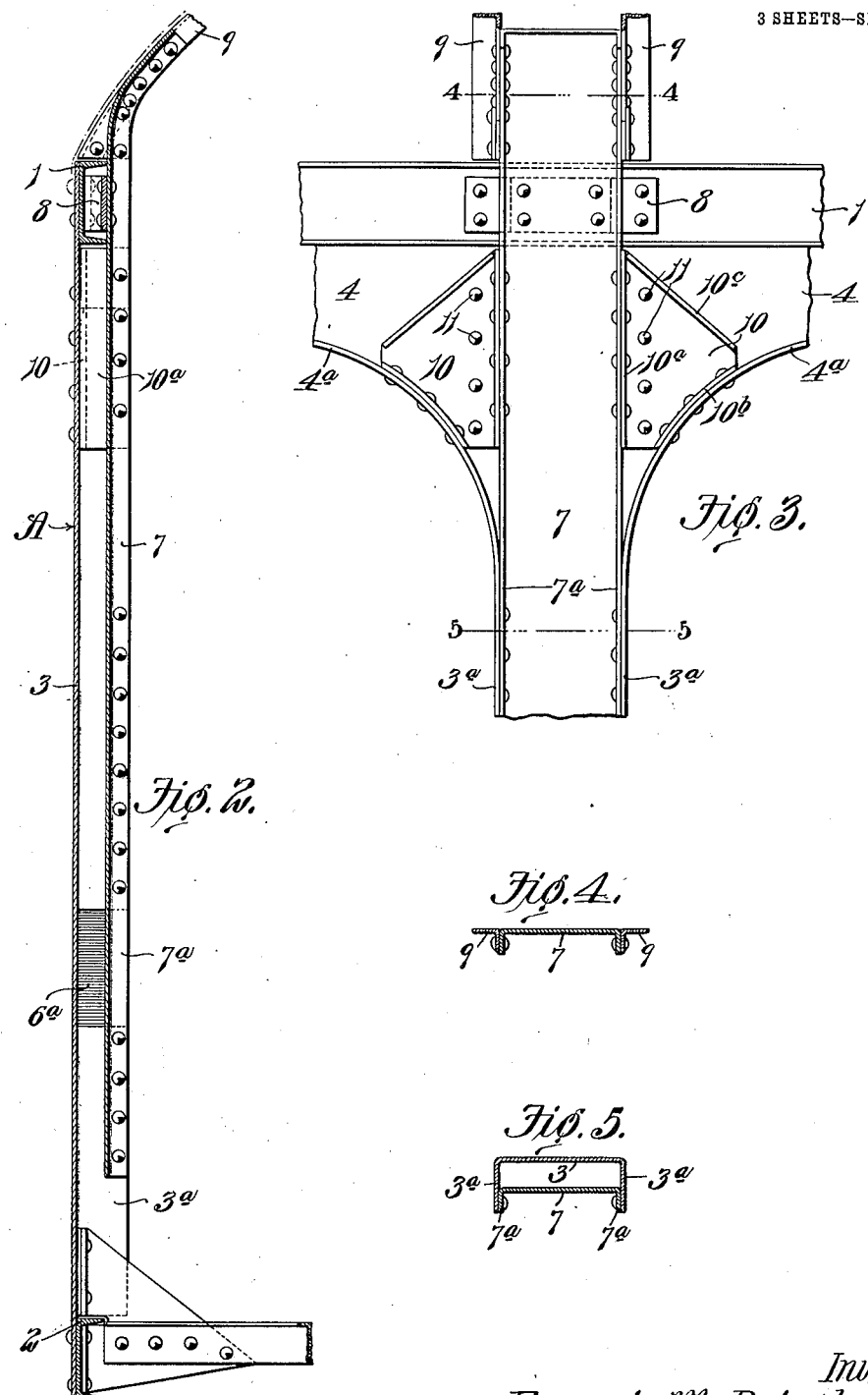

F. M. BRINCKERHOFF.
PASSENGER CAR CONSTRUCTION.
APPLICATION FILED MAY 25, 1908.
909,844.
Patented Jan. 12, 1909.
3 SHEETS—SHEET 3.
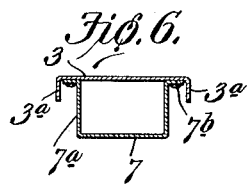
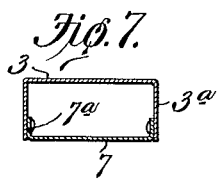
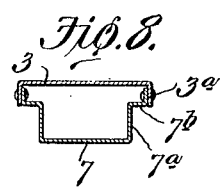
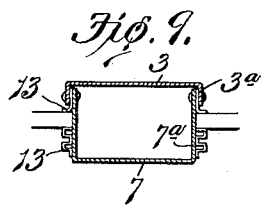
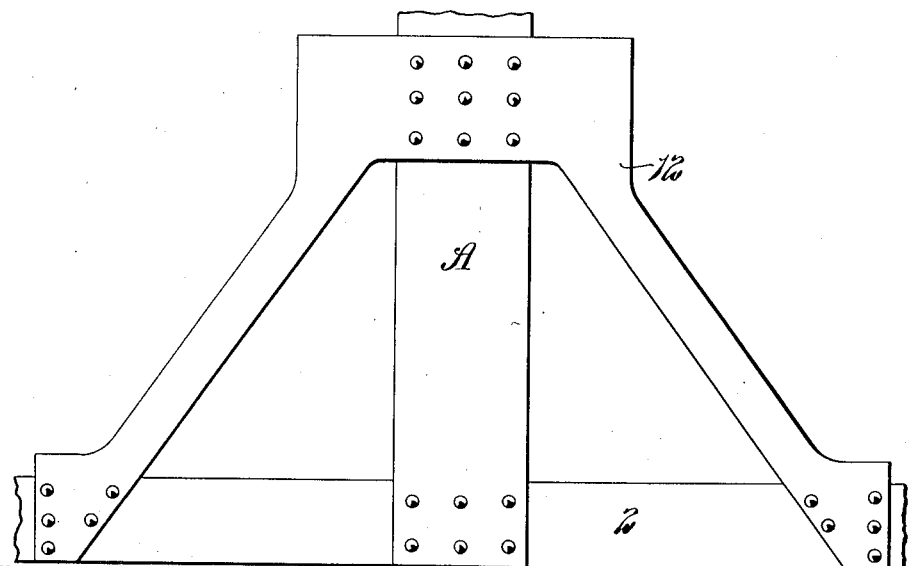
Witnesses:
George Ladson
Wells L. Church
Inventor,
Francis M. Brinckerhoff.
By Bakewell Kerr Attys.

UNITED STATES PATENT OFFICE.

FRANCIS M. BRINCKERHOFF, OF NEW YORK, N. Y., ASSIGNOR OF ONE-THIRD TO HUGH HAZELTON AND ONE-THIRD TO LEWIS B. STILLWELL, OF NEW YORK, N. Y.

PASSENGER-CAR CONSTRUCTION.

No. 909,844.        Specification of Letters Patent.        Patented Jan. 12, 1909.

Application filed May 25, 1908. Serial No. 434,802.

*To all whom it may concern:*

Be it known that I, FRANCIS MCFARLAN BRINCKERHOFF, a citizen of the United States, residing at New York, N. Y., have invented a certain new and useful Improvement in Passenger-Car Construction, of which the following is a full, clear, and exact description, such as will enable others skilled in the art to which it appertains to make and use the same, reference being had to the accompanying drawings, forming part of this specification, in which—

Figure 1 is a side elevation of a portion of a car wall constructed in accordance with my invention; Fig. 2 is a vertical sectional view taken on the line 2—2 of Fig. 1; Fig. 3 is a detail view looking from the inside of the car of one of the side post members and the means for reinforcing same; Fig. 4 is a cross sectional view taken on the line 4—4 of Fig. 3; Fig. 5 is a cross sectional view taken on the line 5—5 of Fig. 3; Figs. 6 to 9, inclusive, are views similar to Fig. 5 of modified forms of my invention; and Fig. 10 is a detail side elevational view of a construction in which the inclined braces are formed by a separate member that is connected to the side post member.

This invention relates to passenger cars, and particularly to steel passenger cars of the type shown in my prior United States Patent No. 849,826, dated April 9, 1907.

One object of my present invention is to provide a passenger car in which the vertical side wall posts that are arranged between the window openings consist of metal members having integral portions that form the letter-board of the car; namely, that portion of the outside sheathing which extends over the windows.

Another object of my invention is to provide a car in which the piers between the window openings are formed by metal members provided with integral portions that form the letter-board of the car. And still another object of my invention is to provide a car having a trussed side wall which consists of an upper chord and a lower chord and a plurality of flanged metal members arranged between said chords and connected thereto, said metal members forming the vertical side wall posts and each being provided with integral inclined braces that are connected to the lower chord and also integral portions that are connected to the upper chord and coöperate with similar portions on the adjacent members to form the letter-board.

Other objects and desirable features of my invention will be hereinafter pointed out.

Referring to the drawings which illustrate the preferred form of my invention, 1 and 2 designate, respectively, the top and bottom chords of the side wall of a car, the top chord 1 forming the upper side plate of the side wall framing. A number of pressed or drawn metal members A are arranged between the chords 1 and 2 and are connected thereto so as to form a rigid truss. In the preferred form of my invention, as shown in Fig. 1, each of the members A has a vertically disposed portion 3 that forms a pier between two window openings and a portion 4 which forms part of the letter-board of the car, the portion 4 being provided at its lower edge with integral inwardly projecting flanges $4^a$ that merge into inwardly projecting flanges $3^a$ on the vertically disposed portion 3, as shown clearly in Fig. 3.

The portion 4 of each of the members A is connected to the outside face of the top chord or upper side plate 1 so as to form part of the outside sheathing of the car and the ends of said portion 4 terminate at approximately the centers of window openings, as shown in Fig. 1, cover plates 5 being arranged over the joints formed between the abutting ends of the adjacent members A so as to impart a neat and finished appearance to the side wall. The lower ends of the vertically disposed channel-shaped portions 3 of the members A are connected to the bottom chord 2, and said portions 3 are provided with integral inclined braces 6 that are connected to the bottom chord 2, each of said braces being provided with an inwardly projecting flange $6^a$ so as to stiffen same.

From the foregoing it will be seen that the side wall is a trussed structure that consists of top and bottom chords and a number of pressed or drawn metal members A that constitute the side wall posts of the car, said members also forming the piers between the window openings and the letter-board which extends above the window openings. The inwardly projecting flanges on the members A impart strength and stiffness to said members but I prefer to reinforce each member by means of a channel-shaped device 7 arranged between the inwardly projecting flanges 3ª on the vertically disposed portion 3 and extending upwardly beyond the side plate or top chord 1, as shown in Figs. 1 and 2. The reinforcing device 7 is arranged inside of the top chord 1 and is connected to the inside face of the web of said chord by means of double Z-shaped brackets 8, and the upper end of said device 7 is connected to the carlines 9 of the roof framing of the car. The channel-shaped reinforcing device 7 is preferably arranged with its side legs or flanges projecting inwardly and its web is spaced away from the web of the member A so as to produce an approximately hollow or box-shaped girder, as shown in Fig. 5.

The letter-board portion 4 of each of the members A is strengthened and reinforced at the point where it merges into the vertically disposed portion 3 by means of plates 10 arranged on opposite sides of the reinforcing device 7 and provided with flanges 10ª and 10ᵇ that are connected, respectively, to the flanges of the reinforcing device 7 and to the inwardly projecting flanges 4ª on the letter-board portion 4, as shown in Fig. 3. The plates 10 are preferably connected to the inside face of the letter-board portion 4 by fastening devices 11, and, if desired, said plates 10 can be provided at their upper edges with flanges 10ᶜ so as to stiffen them.

While I prefer to provide each of the members A with integral inclined braces 6, I do not wish it to be understood that my broad idea is limited to such a construction for if desired the inclined braces can be formed by a separate member 12 that is connected to the vertically disposed portion 3 of the member A and to the bottom chord 2, as shown in Fig. 10.

In Figs. 6 to 9, inclusive, I have illustrated a number of ways in which the vertically disposed portions 3 of the members A and the reinforcing devices 7 can be formed. In the construction shown in Fig. 6 the portion 3 is provided with comparatively short inwardly projecting flanges 3ª and the reinforcing device 7 is arranged with its legs 7ª projecting outwardly or in the opposite direction to that of the construction shown in Fig. 5, the legs of the device 7 being provided with laterally projecting extensions 7ᵇ that are connected to the web of the portion 3 of the member A. The construction illustrated in Fig. 7 is practically the same as that shown in Fig. 5 except that the legs of the reinforcing device 7 project outwardly so that the web of said device extends flush with the inner edges of the flanges 3ª on the vertically disposed portion 3.

The construction illustrated in Fig. 8 is similar to that shown in Fig. 6 except that the legs of the reinforcing device 7 is provided with L-shaped flanges 7ᵇ that are connected to the flanges 3ª on the portion 3 instead of to the web of said portion.

In all of the forms above referred to the stops for the window sashes are either connected to the inwardly projecting flanges of the vertically disposed portions 3 of the members A or to the legs or flanges of the reinforcing devices 7.

In Fig. 9 I have shown a construction in which the sash stops 13 are connected to the reinforcing device 7, said device being provided with long legs or flanges 7ª that are arranged inside of and connected to short inwardly projecting flanges 3ª on the vertically disposed portion 3 of the member A.

While I have herein stated that the members A are "pressed or drawn" metal members it will, of course, be understood that it is immaterial how these members are formed as the flanges on said members can be produced by hand tools, rolls, or dies.

Having thus described my invention, what I claim as new and desire to secure by Letters Patent is:

1. A car provided with side post members having integral portions that form part of the outside sheathing of the car; substantially as described.

2. A car having a side wall which comprises top and bottom chords, and a plurality of pressed or drawn metal members connected to said chords and forming the side posts and the letter-board; substantially as described.

3. A car having a trussed side wall which comprises top and bottom chords, and a plurality of metal members connected to said chords, each of said members having a vertically disposed portion that forms a pier between window openings and a portion that forms part of the letter-board; substantially as described.

4. A car having side posts which consist of flanged metal members that are provided with portions which form part of the letter-board; substantially as described.

5. A car having a side wall which comprises top and bottom chords, pressed or drawn metal members connected to said chords and having portions which form the letter-board, and inclined braces connected to said members and to the bottom chord; substantially as described.

6. A car having a side wall which comprises pressed or drawn metal members that form the side posts and the letter-board, and means for strengthening and reinforcing said members; substantially as described.

7. A car having pressed or drawn metal side post members that are provided with portions which form the letter-board of the car, and reinforcing devices connected to said members and to the roof framing of the car; substantially as described.

8. A car having a side wall which comprises top and bottom chords, metal side post members connected to said chords and having integral portions that form the letter-board, and reinforcing devices connected to said members and to the top chord; substantially as described.

9. A car having a side wall which comprises top and bottom chords, metal side post members connected to said chords and having integral portions that form the letter-board, reinforcing devices connected to said members and to the top chord, and inclined braces connected to said members and to the bottom chord; substantially as described.

10. A car having a side wall which comprises side post members provided with integral portions that form the letter-board, and flanges on said members for strengthening them; substantially as described.

11. A car having approximately channel-shaped side post members that are provided at their upper ends with integral portions which form the letter-board of the car; substantially as described.

12. A car having approximately box-girder side wall posts each of which is formed from a plurality of pressed or drawn metal members, the members which form the outside faces of the posts being provided with integral portions that form the letter-board; substantially as described.

13. A car having a side wall which comprises a plurality of pressed or drawn metal members, each of which consists of a vertically disposed portion that forms a pier between window openings and a portion that forms part of the letter-board, a reinforcing device connected to the vertically disposed portion of each of said members, and means for connecting said reinforcing device to the portion of said member that forms part of the letter-board; substantially as described.

14. A car having side post members which comprise approximately channel-shaped portions that are arranged between window openings and integral portions that form the letter-board, and channel-shaped reinforcing devices connected to the channel-shaped portions of said members and to the roof framing of the car; substantially as described.

15. A car wall provided with pressed or drawn metal members, each of which comprises a vertically disposed portion that is arranged between window openings, a portion that forms part of the letter-board, and integral inclined braces; substantially as described.

16. A car wall provided with pressed or drawn metal members, each of which comprises a vertically disposed portion that is arranged between window openings, a portion that forms part of the letter-board, integral inclined braces, strengthening flanges on said member, and a reinforcing device connected to the vertically disposed portion of said member and to the roof framing of the car; substantially as described.

17. A car having a side wall which comprises top and bottom chords, metal members connected to said chords and each having a vertically disposed channel-shaped portion that is arranged between window openings, a portion that forms part of the letter-board and integral inclined braces that are connected to the bottom chord, a channel-shaped reinforcing device connected to the vertically disposed portion of each of said members and also to the top chord, and plates connected to the letter-board portions of said members and to the reinforcing devices; substantially as described.

18. A car having pressed or drawn metal side post members, each of which comprises a vertically disposed portion that is arranged between window openings, and an integral letter-board portion having its ends terminating at approximately the centers of window openings; substantially as described.

19. A car having pressed or drawn metal side post members, each of which comprises a vertically disposed portion that is arranged between window openings, an integral letter-board portion having its ends terminating at approximately the centers of window openings, and cover plates arranged over the joints formed between the abutting ends of the letter board portions of said members; substantially as described.

20. A car having pressed or drawn metal side post members, each of which comprises a vertically disposed channel-shaped portion that is arranged between window openings and an integral flanged letter-board portion, and an approximately channel-shaped reinforcing device connected to the vertically disposed portion of said member and coöperating therewith to form a hollow box-girder; substantially as described.

21. A car wall having top and bottom chords, pressed or drawn metal members extending upwardly from the bottom chord to form the side posts and provided with integral portions that form the letter-board, reinforcing devices connected to said members and extending upwardly inside of the top chord, and roof carlines connected to said reinforcing devices; substantially as described.

22. A car wall having top and bottom chords, pressed or drawn metal members extending upwardly from the bottom chord to form the side posts and provided with integral portions that form the letter-board, reinforcing devices connected to said members and extending upwardly inside of the top chord, roof carlines connected to said reinforcing devices, and inclined braces connected to the side post portions of said members and to the letter-board; substantially as described.

In testimony whereof I hereunto affix my signature in the presence of two witnesses, this 20th day of May 1908.

FRANCIS M. BRINCKERHOFF.

Witnesses:
WILLIAM E. RUNDLE,
W. J. DORMER.